United States Patent [19]

Weyer

[11] Patent Number: 4,960,007

[45] Date of Patent: Oct. 2, 1990

[54] CAM-HELICAL ACTUATOR WITH BACKLASH ELIMINATION

[76] Inventor: Paul P. Weyer, 48811-284th Ave. SE., Enumclaw, Wash. 98022

[21] Appl. No.: 254,374

[22] Filed: Oct. 5, 1988

Related U.S. Application Data

[63] Continuation-in-part of Ser. No. 62,504, Jun. 15, 1987, Pat. No. 4,858,486, and a continuation-in-part of Ser. No. 692,293, Jan. 17, 1985, Pat. No. 4,683,767.

[51] Int. Cl.$^5$ .............................................. F01B 3/00
[52] U.S. Cl. ................................ 74/89.15; 74/409; 74/424.8 R; 92/33
[58] Field of Search ............... 74/89.15, 424.8 R, 409, 74/459, 440, 465; 92/31, 32, 33

[56] References Cited

U.S. PATENT DOCUMENTS

| | | | |
|---|---|---|---|
| 2,067,357 | 1/1937 | Terry | 74/424.8 R |
| 2,791,128 | 5/1957 | Geyer et al. | 74/441 |
| 2,936,737 | 5/1960 | Miller | 91/465 |
| 2,945,387 | 7/1960 | Geyer | 74/441 |
| 2,959,064 | 11/1960 | Geyer et al. | 92/33 |
| 3,020,775 | 5/1960 | Musser | 74/440 |
| 3,169,407 | 2/1965 | Newell | 74/424.8 R |
| 3,187,592 | 6/1965 | Geyer | 92/33 |
| 3,255,806 | 6/1966 | Meyer et al. | 92/33 |
| 3,296,880 | 1/1967 | Maroth | 74/459 |
| 3,308,674 | 3/1967 | Maroth | 74/424.8 R |
| 3,388,603 | 6/1968 | Clark | 92/33 |
| 3,499,342 | 3/1970 | Ligh | 74/89.15 |
| 3,638,507 | 2/1972 | Orner | 74/424.8 R |
| 3,648,535 | 3/1972 | Maroth | 74/465 |
| 3,670,583 | 6/1972 | Leming | 74/89.15 |
| 3,766,788 | 10/1973 | Metz | 74/424.8 R |
| 4,008,625 | 2/1977 | Malhotra | 74/459 |
| 4,022,076 | 5/1977 | Metz | 74/89.15 |
| 4,036,074 | 7/1977 | Bodnar | 74/409 |
| 4,274,296 | 6/1981 | Miller et al. | 74/459 |
| 4,313,367 | 2/1982 | Weyer | 92/33 |
| 4,369,011 | 1/1983 | Ploss | 74/424.8 R |
| 4,683,767 | 8/1987 | Weyer | 74/409 |
| 4,741,250 | 5/1988 | Weyer | 92/33 |

FOREIGN PATENT DOCUMENTS

| | | | |
|---|---|---|---|
| 2115707 | 2/1972 | Fed. Rep. of Germany | 92/33 |
| 2338425 | 1/1977 | France . | |
| 386809 | 4/1965 | Switzerland | 74/409 |
| 635176 | 3/1983 | Switzerland | 74/424.8 R |
| 304380 | 7/1971 | U.S.S.R. | 74/459 |
| 890440 | 4/1960 | United Kingdom . | |
| 1362401 | 8/1971 | United Kingdom . | |

OTHER PUBLICATIONS

Mechanisms, Linkages, and Mechanical Controls, by Nicholas P. Chironis; Scientific Library 4/14/82 pp. 188–189.

How to Provide for Backlash, by Clifford T. Bower London, England pp. 188–189.

Moscow Bauman Tech. Coll. Week 84/20 Issued Jun. 27, 1984.

Carter Helical Rod Series, Carter Controls, Inc. Bulletin RA-500 E (Applicant admits this reference is prior art.).

Primary Examiner—
Assistant Examiner—Scott Anchell
Attorney, Agent, or Firm—Seed and Berry

[57] ABSTRACT

The fluid-powered actuator having a body, an axially extending rotatable shaft with a plurality of helical grooves, and an annular piston sleeve reciprocally mounted within the body and receiving the shaft therethrough. The piston sleeve has a plurality of radial bores extending fully therethrough with an inward open end adjacent to the grooved shaft. Guide pins are rotatably disposed in each of the pistion sleeve bores and ride in the shaft grooves. An annular carrier is reciprocally mounted within the body coaxial with the piston sleeve and is adjustably axially movable relative thereto. The carrier has a plurality of radial bores extending fully therethrough with an inward end adjacent to the grooved shaft. Guide pins are rotatably disposed in each of the carrier bores and ride the shaft grooves. Rotation of the carrier is prvented is prevented relative to the piston sleeve. An adjustably rotatable collar extends between the piston sleeve and the carrier to selectively set the axial distance between the piston sleeve and collar to eliminate backlash. The collar also serves to limit the radial outward movement of the pins in the bores. Lock nuts are provided to prevent axial movement of the carrier relative to the piston sleeve during fluid-powered operation.

17 Claims, 1 Drawing Sheet

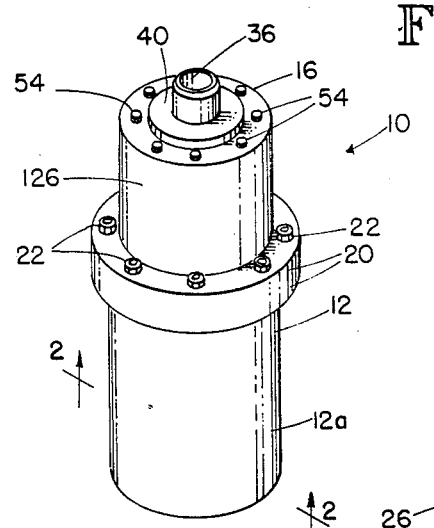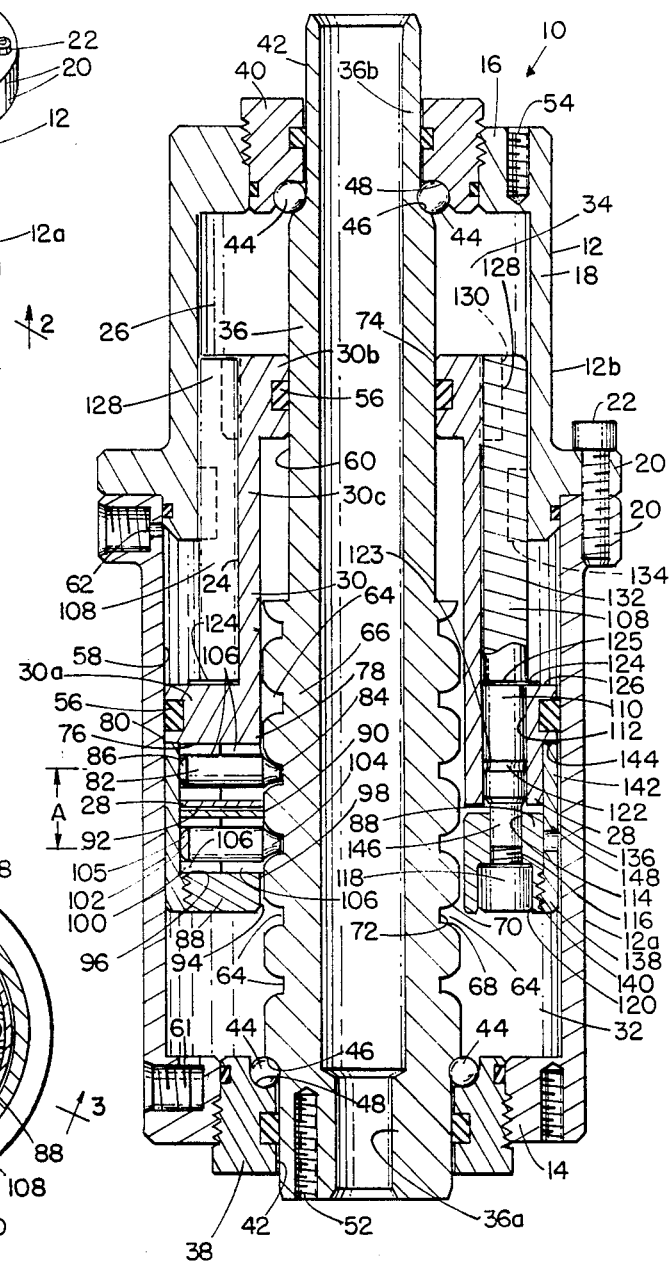

CAM-HELICAL ACTUATOR WITH BACKLASH ELIMINATION

CROSS-REFERENCE TO RELATED APPLICATION

This is a continuation-in-part of Ser. No. 062,504, filed June 15, 1987, now U.S. Pat. No. 4,858,486, and application Ser. No. 692,293, filed Jan. 17, 1985, now U.S. Pat. No. 4,683,767.

TECHNICAL FIELD

The present invention relates generally to actuators, and more particularly, to fluid-powered actuators of the type in which axial movement of a piston produces relative rotational movement between a body and an output shaft.

BACKGROUND ART

Rotary helically splined actuators have been employed in the past to achieve the advantages of high-torque output from a simple linear piston and-cylinder drive arrangement. The actuators typically employed a cylindrical body with an elongated rotary output shaft extending from end to end coaxially within the body, with an end portion of the shaft providing the drive output. Disposed between the body and the shaft is a piston sleeve, having a sleeve splined to cooperate with corresponding splines on the body interior and the output shaft exterior. The piston sleeve is reciprocally mounted within the body and has a piston head for the application of fluid pressure to one or the other opposing sides thereof to produce axial movement of the piston sleeve. The sleeve is elongated and coaxially receives the shaft therein.

As the piston sleeve linearly reciprocates in an axial direction within the body, the outer splines of the sleeve engage the splines of the body to cause rotation of the sleeve. The resulting linear and rotational movement of the sleeve is transmitted through the inner splines of the sleeve to the splines of the shaft to cause the shaft to rotate. Bearings are typically supplied to rotatably support one or both ends of the shaft relative to the body.

With such an arrangement, as the piston sleeve reciprocally moves from one axial direction to the other to produce relative rotational movement between the body and the shaft in response to the application of fluid pressure to the piston head, backlash results from the slack existing between the intermeshing splines of the sleeve and the body and the intermeshing splines of the sleeve and the shaft. While accurate machining of the splines will reduce the backlash problem, this procedure substantially increases the manufacturing cost. Even with accurate machining, conventional machining techniques are virtually incapable of totally eliminating the slack which produces the backlash problem. Furthermore, to the extent more accurate tolerances produce actuator parts which fit tightly together and reduce slack, assembly of the actuator becomes difficult. While accurate machining reduces slack initially, should the spline parts wear during usage or otherwise lose their original tolerances, no means exist for elimination of the slack that develops without remachining or replacement of the splined parts.

It will therefore be appreciated that there has been a significant need for a fluid-powered rotary actuator which does not require exceptionally accurate machining of the torque-transmitting parts to eliminate slack that produces backlash. The actuator should be easy to assemble and provide means for substantially complete elimination of the slack causing the backlash problem after the actuator components with the slack are assembled. Elimination of the slack should be accomplished in a simple manner without requiring disassembly of the torque-transmitting parts. Furthermore, the means for elimination of the slack should, with one adjustment, simultaneously equally remove the slack existing between all of the torque-transmitting parts between the piston sleeve and the shaft which translate linear movement of the piston sleeve into rotational movement of the shaft. It is desirable that the actuator have a very low weight and large torque-to-weight ratio while providing rotation of up to 180 degrees or more. The present invention fulfills these needs and further provides other related advantages.

DISCLOSURE OF THE INVENTION

The present invention resides in a fluid-powered actuator having a body, with first and second axially spaced apart ends, and an axially extending, rotatable member positioned within the body and supported for rotation relative to the body. The member has a plurality of exterior helical grooves extending over an axial portion of the length of the member. Each of the member grooves has a pair of elongated, opposing first and second groove sidewalls spaced apart from each other. The first groove sidewall is positioned to one axial side of the groove toward the body first end and the second groove sidewall is positioned to an opposite axial side of the groove toward the body second end.

The actuator further includes a sleeve reciprocally mounted within the body. The sleeve has a central, axially extending opening coaxially receiving the member therein. The sleeve has a plurality of radially extending bores extending fully therethrough and positioned with an inward end bore opening adjacent to the grooved axial portion of the member and an outward end bore opening. The sleeve has a first end portion positioned toward the body first end.

At least one piston is reciprocally mounted within the body for application of fluid pressure to one or the other opposing axial sides thereof to produce axial movement of the piston within the body under fluid-powered operation of the actuator. The piston operatively engages the sleeve to axially move the sleeve in response to axial movement of the piston.

Torque-transmitting means are provided for transmitting torque between the sleeve and the body in response to axial movement of the piston. The actuator includes a plurality of first guide pins with each of the first guide pins being disposed in one of the sleeve radial bores. An inward end pin portion projects out of the sleeve inward end bore opening and into one of the member grooves and an outward end pin portion is positioned at the sleeve outward end bore opening. The first guide pins transmit torque between the sleeve and the member in response to axial movement of the piston.

An annular pin carrier is reciprocally mounted within the body coaxial with the sleeve and axially outward of the sleeve first end portion. The carrier has a central, axially extending opening coaxially receiving the member therein. The carrier has a plurality of radially extending bores extending fully therethrough and positioned with an inward end bore opening adjacent to the grooved axial portion of the member and an outward end bore opening. The carrier is adjustably axially movable within at least a limited axial range relative to the sleeve without producing relative rotation between the carrier and the sleeve. The carrier has a first end portion positioned towards the body first end and a second end portion positioned toward the sleeve first end portion.

A plurality of second guide pins are provided with each of the second guide pins being disposed in one of the carrier radial bores. An inward end pin portion projects out of the carrier inward end bore opening and into one of the member grooves and an outward end pin portion is positioned at the carrier outward end bore opening. The second guide pins transmit torque between the carrier and the member in response to axial movement of the piston.

A collar is mounted within the body coaxial with the sleeve. The collar is adjustably rotatable within at least a limited rotational range relative to the sleeve and the carrier. The collar has a first end portion engaging the carrier toward the carrier first end portion and a second end portion engaging the sleeve first end portion. The collar has a circumferentially extending sidewall portion positioned between the collar first and second end portions and radially outward of the carrier to engage the outward end pin portions of the first and second guide pins and limit radial movement of the first and second guide pins in a radially outward direction away from the member grooves as a result of forces applied thereto by rotational adjusting movement of the collar to eliminate backlash and by fluid-powered operation of the actuator.

The actuator also includes adjustment means for producing axial adjusting movement of the carrier relative to the piston sleeve in response to rotational adjusting movement of the collar. Adjusting rotation of the collar in one rotational direction produces axial adjusting movement of the carrier in one axial direction and adjusting rotation of the collar in an opposite rotational direction produces axial adjusting movement of the carrier in an opposite axial direction to produce adjustable and oppositely directed axial forces on the sleeve and the carrier sufficient to place the first guide pin inward end pin portions in firmly seated engagement with one of either the first or second groove sidewalls and the second guide pin inward end pin portions in firmly seated engagement with the other one of the first or second groove sidewalls to substantially eliminate backlash between the first guide pins and the member grooves engaged thereby and between the second guide pins and the member grooves engaged thereby as the sleeve moves from one axial direction to the other to produce relative rotational movement between the body and the member in response to selective application of fluid pressure to the piston.

The actuator further includes lock means for preventing rotational and axial movement of the carrier relative to the sleeve during fluid-powered operation of the actuator while permitting substantially uninhibited axial adjusting movement of the carrier relative to the sleeve within the limited axial range during rotational adjusting movement of the collar.

Other features and advantages of the invention will become apparent from the following detailed description, taken in conjunction with the accompanying drawings.

BRIEF DESCRIPTION OF THE DRAWINGS

FIG. 1 is an isometric view of a fluid-powered helical actuator embodying the present invention.

FIG. 2 is a sectional view taken substantially along the lines 2—2 of FIG. 1.

FIG. 3 is a side elevational, sectional view taken substantially along the lines 3—3 of FIG. 2.

BEST MODE FOR CARRYING OUT THE INVENTION

As shown in the drawings for purposes of illustration, the present invention is embodied in a fluid-powered rotary actuator, indicated generally by reference numeral 10. The actuator 10 includes a generally cylindrical body 12 having first and second axially spaced-apart end walls 14 and 16, and a circumferential sidewall 18. The body 12 is formed by a pair of first and second half housings 12a and 12b which are generally cylindrical, and each having one of the end walls 14 and 16, respective)y, at one end and an open end with an attachment flange 20 at the other end. The first and second half housings 12a and 12b are fixedly secured together by a plurality of fasteners 22 which connect together the two attachment flanges 20.

The actuator 10 includes a generally cylindrical piston sleeve 24 coaxially and reciprocally disposed within an axially extending interior chamber 26 of the body 12. The piston sleeve 24 has a sleeve portion 28 and an annular piston head portion 30 formed as an integral unit. The piston head portion 30 includes first and second axially separated first and second piston heads 30a and 30b, respectively, interconnected by a cylindrical sleeve member 30c.

The piston head portion 30 of the piston sleeve 24 defines a first fluid-tight compartment 32 of the chamber 26 to an axially outward side of the piston head portion toward the first end wall 14. The application of fluid pressure to the first compartment 32 produces axial movement of the piston sleeve 24 toward the second end wall 16. The piston head portion 30 of the piston sleeve 24 also defines a fluid-tight compartment 34 of the chamber 26 to an axially outward side of the piston head portion toward the second end wall 16. The application of fluid pressure to the second compartment 34 produces axial movement of the piston sleeve 24 toward the first end wall 14. The actuator 10 provides relative rotational movement between the body 12 and a rotary output shaft 36 through the conversion of linear movement of the piston sleeve 24 into rotational movement of the shaft. The rotary output shaft 36 is coaxially positioned within the body 12 and supported for rotation relative to the body.

The actuator 10 has an annular first end cap 38 threadably attached to the body 12 at the first end wall 14 and an annular second end cap 40 threadably attached to the body at the second end wall 16. The shaft 36 has two end portions 36a and 36b which each extend through a central aperture 42 in one or the other of the caps 38 and 40, and the shaft is supported by axial thrust bearings 44 positioned between the caps and the shaft. A circumferential quarter ball race 46 is formed on each of the end portions 36a and 36b of the shaft 36, and the end caps 38 and 40 each have an axially inward opening ball race 48 extending about the apertures 42 therein and confronting the corresponding ball race 46 on the shaft end portions.

The shaft 36 extends outward through each of the apertures 42 in the caps 38 and 40 and the first end portion projects beyond the first end cap 38 for coupling to an external device (not shown) by a plurality of threaded bore holes 52. A plurality of threaded bore holes 54 are provided in the second end wall 16 of the body 12 for attachment of the body to a support frame (not shown).

The piston head portion 30 of the piston sleeve 24 carries conventional inner and outer seals 56 disposed between the first head 30a and a corresponding smooth interior wall surface portion 58 of the body sidewall 18 and the second head 30b and a smooth outer surface portion 60 of the shaft 36 to define the fluid-tight compartments 32 and 34. The smooth surface portions have sufficient axial length to accommodate the full stroke of the piston sleeve 24 within the chamber 26. In the presently preferred embodiment, the piston sleeve 24 has a stroke of 2.45 inches. Axial reciprocation of the piston sleeve 24 within the chamber 26 occurs when hydraulic fluid or air under pressure selectively enters through one or the other of a pair of ports 61 and 62 in the body 12, each located to an opposite axial side of the piston head portion 30, which communicate with the fluid-tight compartments 32 and 34, respectively.

The shaft 36 has eight helical grooves 64 integrally formed on a midportion 66 thereof and extending over the axial length of the midportion. The grooves 64 have substantially identical lead and pitch, and each of the grooves is defined by a pair of elongated, opposing first and second groove flanks or sidewalls 68 and 70, with a groove bottom wall 72 extending between the groove sidewalls. In the presently preferred embodiment, the grooves 64 have a 45 degree helix angle and a 4.9 inch lead. The groove sidewalls 68 and 70 each have a flank or pressure angle of nominally 20 degrees. The grooved shaft midportion 66 has a pitch diameter of 1.56 inches.

The piston sleeve 24 has a central, axially extending opening 74 coaxially receiving the shaft 36 therein. The sleeve portion 28 has eight circumferentially distributed, radially extending through bores 76 which extend fully therethrough. The bores 76 are positioned with an inward end bore opening 78 communicating with the central opening 74 of the piston sleeve 24 at a position adjacent to the grooved shaft midportion 66. Each of the bores 76 further has an outward end bore opening 80 positioned radially outward from the inward end bore opening 78.

The actuator 10 further includes a first set of eight rotatable cam follower guide pins 82. Each of the first guide pins 82 is disposed in a different one of the piston sleeve radial bores 76 and projects out of the inward end bore opening 78 to position a tapered inward end 84 of the guide pin in a different one of the eight shaft grooves 64 to rollingly engage the groove sidewalls. The first guide pins 82 have sufficient length to position an outward end 86 of each pin at the outward end bore opening 80 of the sleeve portion 28. The first guide pins 82 transmit torque between the piston sleeve 24 and the shaft 36 in response to axial movement of the piston sleeve.

To eliminate the backlash that will inevitably exist as a result of the slack or free movement between the first guide pins 82 and the shaft grooves 64 which they engage to transmit torque, the actuator 10 includes an annular pin carrier 88 reciprocally mounted within the body 12 coaxial with the piston sleeve 24. The carrier 88 is positioned to an axially outward side of a first end portion 90 of the sleeve portion 28 toward the first end wall 14 of the body 12, and a space 92 is provide therebetween to accommodate axial adjusting movement of the carrier, as will be described in more detail below. The carrier 88 has a central, axially extending opening 94 which coaxially receives the shaft 36 therein.

Much as just described for the sleeve portion 28, the carrier 88 has eight circumferentially distributed radially extending through bores 96 which extend fully therethrough. The bores 96 are positioned with an inward end bore opening 98 communicating with the central opening 74 of the piston sleeve 24 at a position adjacent to the grooved shaft midportion 66. Each of the bores 96 further has an outward end bore opening 100 positioned radially outward from the inward end bore opening 98.

As with the sleeve portion 28 described above, a second set of eight rotatable cam follower guide pins 102 is provided. Each of the second guide pins 102 is disposed in a different one of the carrier radial bores 96 and projects out of the carrier inward end bore opening 98 to position a tapered inward end 104 of the guide pin in a different one of the eight shaft grooves 64 to rollingly engage the groove sidewalls. The second guide pins 102 have sufficient length to position an outward end 105 of each pin at the outward end bore opening 100 of the carrier 88. While the second guide pins 102 tend to transmit torque between the carrier 88 and the shaft 36 in response to axial movement of the piston sleeve 24, the primary purpose of the carrier and second guide pins is the elimination of backlash, as will be described in more detail below. In the preferred embodiment, the first and second guide pins 82 and 102 have a 0.312 inch diameter and are manufactured of steel.

Each of the first and second guide pins 82 and 102 is journaled in its piston sleeve or carrier radial bore 76 or 96, by two rows of needle roller bearings 106. The needle roller bearings 106 are circumferentially distributed about each guide pin between the guide pin and the interior wall of the bore within which the guide pin is disposed to facilitate rotation of the guide pins as the guide pin tapered inward ends 84 and 104 rollably engage the shaft grooves 64.during fluid-powered operation of the actuator 10. Much as with a ball bearing, the rolling friction of the guide pins is substantially less than the sliding friction of splines to increase the output efficiency of the actuator 10. Splines have such an undesirably high frictional coefficient that the output efficiency of the actuator is reduced significantly by their use.

It is necessary to provide for the transmission of torque between the piston sleeve 24 and the body 12 as the piston sleeve axially moves during fluid-powered operation of the actuator 10 to produce relative rotational movement between the shaft 36 and the body. This torque transmission is provided by a set of eight axially extending slider rods 108. The rods 108 are attached to the piston sleeve 24 for travel therewith during fluid-powered operation of the actuator 10. A first end portion 110 of each of the rods 108 projects into one of eight apertures 112 formed in the piston head portion 30 and extending fully through the sleeve portion 28, and projects beyond the sleeve portion in the direction of the first end wall 14 into one of eight apertures 114 in the carrier 88. The length of the first end portion 110 of the rods 108 which project into the carrier apertures 114 has a reduced diameter, with an exteriorly threaded end portion 116 for threadably receiving a lock nut 118.

Eight recesses 120 are provided in the carrier 88 to a side toward the first end wall 14 to receive the lock nuts 118 when threaded onto the rods 108. The carrier 88 is axially slidable on the reduced diameter portions of the first end 110 portion of the rods 108 when the lock nuts 118 are loosened so that the backlash elimination adjustment can be made, as will be explained in more detail below.

An O-ring 122 is mounted in a circumferential O-ring groove 123 in each of the first end portions 110 of the rods 108 at a position to be within the apertures 112 of the sleeve portion 28 so as to prevent passage of fluid through the apertures 112 and between the first and second fluid-tight compartments 32 and 34. A retainer ring 124 is mounted in a circumferential groove 125 in each of the rods 108 at a position to engage a shoulder 126 of the piston head portion 30. The retainer rings 124 prevent axial movement of the rods 108 relative to the piston sleeve 24 in an axial direction toward the first end wall 14 as the lock nuts 118 are tightened on the threaded end portions 116 of the rods. By tightening the lock nuts 118, the carrier 88 is drawn toward the piston sleeve 28.

A second end portion 128 of each of the rods 108 is retained in one of eight semicircular axially grooved saddles 130 formed as an integral part of the piston sleeve 24 at an end of the piston head portion 30 toward the second end wall 16. The saddles 130 prevent the lateral movement of the rods 108 as does the projection of the rods into the piston sleeve apertures 112. The eight rods 108 each have a midportion 132 with a smooth exterior surface which is slidably received in one of eight semicircular axially grooved saddles 134 formed as an integral part of the body sidewall 18.

As the piston sleeve 24 axially reciprocates within the body during fluid-powered operation of the actuator 10, the rods 108 travel with the piston sleeve and slide in the body saddles 134. Not only is torque transmitted between the piston sleeve 24 and the body 12 through the engagement of the rods 108 with the body saddles 134, but the rods and body saddles also operate to inhibit rotation of the piston sleeve relative to the body as the piston sleeve reciprocates. As such, only axial travel of the piston sleeve 24 is permitted.

In the presently preferred embodiment of the invention shown in FIG. 1, the body 12 and the piston sleeve 24 are manufactured of aluminum to reduce weight and only the shaft 36 and the torque-transmitting elements are made of steel so as to substantially reduce the weight of the actuator 10. The slider rods 108 are manufactured of steel and serve as an intermediate between the aluminum piston sleeve and body. The result is a lightweight actuator 10 weighing about 10 pounds, which produces a torque of 5,000 inch-pounds when operating at 1,000 ps fluid pressure. The torque-to-weight ratio produced is 500:1 with a 180 degree rotation range for the shaft. The actuator 10 has an efficiency of 78 percent.

It is noted that means of torque transmission other than the rods 108 can be utilized if it is desired to have the piston sleeve 24 rotate relative to the body 12 as it reciprocates. With the use of straight slider rods 108 in the presently preferred embodiment of the invention, substantially uninhibited sliding motion of the piston sleeve relative to the body is permitted, with substantially no backlash, and thus no adjustment means is required to eliminate backlash. This is because the grooves of the body saddles 134 can be accurately machined for minimum backlash, and the rods 108 can be accurately sized and highly polished to also minimize backlash and facilitate sliding. While splines between the body and the piston sleeve could be utilized to transmit torque, it would not then be desirable to manufacture the piston sleeve from aluminum since aluminum would not wear well against an aluminum body. Using a steel piston sleeve or steel ring gears attached to the body would improve wear but add weight to the actuator.

As the piston sleeve 24 linearly reciprocates between one or the other axial direction within the chamber 26 during fluid-powered operation of The actuator 10, the piston sleeve is prevented from rotating relative to the body by the rods 108 slidably engaging the body saddles 134. The linear movement of the piston sleeve 24 is converted into rotational movement of the shaft 36 relative thereto through the coaction of the first and second guide pins 82 and 102 rollably engaging the helical grooves 64 in the shaft 36. The torque transmitted to the shaft 36 causes the shaft to rotate relative to the body 12 since axial movement of the shaft is restricted by the thrust bearings 44. As such, axial movement of the piston sleeve 24 is converted into relative rotational movement between the body 12 and the shaft 36. Movement of the piston sleeve 24 in one axial direction causes rotation of the shaft 36 in either a clockwise or counterclockwise rotational direction, depending on the turn of the shaft grooves 64 and movement of the piston sleeve in the opposite axial direction causes rotation of the shaft in the opposite rotational direction. Of course, the direction the piston sleeve is moved depends upon which of the two fluid-tight compartments 32 or 34 the fluid pressure is being applied.

To provide for adjustment to eliminate backlash as a result of the slack or free movement between the first and second guide pins 82 and 102 and the shaft grooves 64, the actuator 0 includes an adjustment collar 136 mounted within the body 12 coaxial with the piston sleeve 24 and the carrier 88. The collar 136 has an interiorly threaded first end portion 138 threadably engaging a threaded end portion 140 of the carrier 88 located toward the first end wall 14. A second end portion 142 of the collar 136 is slidably seated a circumferential shoulder 144 of the sleeve portion 28 of the piston sleeve 24 to permit substantially uninhibited rotational adjusting movement of the collar relative to the piston sleeve. The shoulder 144, however, inhibits axial movement of the collar 136 relative to the piston sleeve 24 in a direction toward the second end wall 16.

By allowing the collar 136 to be adjustably rotatable within at least a limited rotational range relative to the piston sleeve 24 while inhibiting axial movement of the collar toward the second end wall 16, rotation of the collar applies an axially directed adjustment force on the carrier 88 through the threaded engagement of the threaded first end portion 138 of the collar with the threaded carrier portion 140. This axial adjustment force, applied simply by rotating the collar 136, is used to selectively set the axial distance between the carrier 88 and the piston sleeve 24, and thereby adjust the axial distance between the first guide pins 82 and the second guide pins 102 for purposes of eliminating backlash. Since the piston sleeve 24 and the carrier 88 are locked together during fluid-powered operation, as will be described below, and since each groove of the shaft grooves 64 will have one guide pin of the first guide pins 82 and one guide pin of the second guide pins 102 seated or riding therein, there is created a specific requirement for the axial distance between these two guide pins (as well as all of the other such pairs of guide pins which ride in the same groove). For example, if the pair of guide pins sharing the same groove are rotationally offset relative to each other along the groove by 45 degrees, and the lead of the helical shaft groove is 4.9 inches, then the axial distance (indicated by letter A in FIG. 3), must be 0.6125 inch, calculated as A=(45 degrees/360 degrees)×4.9 inches=0.6125 inch, or alternatively calculated, A=4.9 inches/8 grooves=0.6125 inch.

It is noted that rotation of the collar 136 in one rotational direction tends to push the carrier 88 away from the piston sleeve 24, while rotation in the opposite rotational direction tends to pull the carrier toward the piston sleeve. In the latter situation, since the collar 136 is not attached to the piston sleeve 24 to prevent its axial movement toward the first end wall 14, the rotation of the collar may result in pulling the collar end portion 42 away from the shoulder 144. Even in this situation the collar will establish the axial distance between the carrier and the piston sleeve, but an axial force applied in the direction of the second end wall must be applied to the collar while it is being rotated to accomplish the adjustment so as to maintain the collar end portion 142 seated in the shoulder 144. After backlash has been adjusted out by rotating the collar 136 with the lock nuts 118 loosened to set the desired distance between the first and second guide pins 82 and 102, and before fluid-powered operation of the actuator 10 is commenced, the lock nuts 118 are tightened on the threaded end portions 116 of the rods 108 to lock the carrier in position relative to the piston sleeve. With the lock nuts 118 loosened for backlash elimination adjustment, the carrier 88 is free to move axially, sliding on the reduced diameter portion of the first end portion 110 of the rods 108 but cannot rotate. As such, rotational adjusting movement of the collar 136 is translated only into axial movement of the carrier 88.

When the collar 136 is rotated in a direction to eliminate backlash by setting the axial spacing between the first and second guide pins 82 and 102, the tapered ends 84 of the first guide pins are placed in firmly seated rolling engagement with either the first or second groove sidewall 68 or 70 of the shaft grooves 64 into which they project, and the tapered ends 104 of the second guide pins are placed in firmly seated rolling engagement with the other one of the first or second groove sidewall. This substantially eliminates all backlash between the first guide pins and the shaft grooves and between the second guide pins and the shaft grooves that would otherwise result as the piston sleeve 24 moves from one axial direction to the other within the body 12 during fluid powered operation of the actuator 10. Furthermore, the backlash is eliminated equally among the guide pins so substantially equal load sharing among the guide pins results.

In the actuator 10 of the presently preferred embodiment, since only the shaft 36 and the piston sleeve 24 are in rotation producing contact, the first and second guide pins 82 and 102 and the shaft grooves 64 experience the greatest wear. Since this contact is only a rolling contact, with no sliding or scuffing components as realized with other actuator designs, less wear is encountered. However, with the present design, if backlash is not eliminated, it will occur on a small pitch radius, so its elimination is most important.

With the present invention, backlash elimination is easily and effectively eliminated simply by rotating the collar 136 to adjust the axial position of the carrier 88 relative to the piston sleeve 24. After the backlash adjustment has been completed, the lock nuts 118 are tightened on the threaded end portion 116 of the rods 108 to pull the carrier toward the piston sleeve and thereby retain and lock the spacing set between the carrier 88 and the piston sleeve 24 by inhibiting axial movement of the carrier relative to the piston sleeve during fluid-powered operation of the actuator 10. This also causes the carrier 88 and the piston sleeve 24 to travel together as a unit in unison during fluid-powered operation of the actuator with substantially all backlash eliminated as the piston sleeve reciprocates within the chamber 26.

Should usage of the actuator 10 cause wear of the tapered ends 84 and 104 of the first and second guide pins 82 and 102 or the shaft grooves 64, or should slack occur for any other reason, the slack may be easily removed in the same manner described above by further adjustment of the collar 136. With the present invention, the shaft grooves may be manufactured using conventional machining techniques with standard tolerances, and the slack which creates the backlash problem can be eliminated by adjustment prior to fluid-powered operation of the actuator. Furthermore, the shaft grooves and the guide pins can be machined with a size which permits easy assembly of the actuator and any slack thereby introduced can be eliminated by adjustment.

Both during rotational adjusting movement of the collar 136 to eliminate backlash and during fluid-powered operation of the actuator 10, an axially outward force will be realized on each of the first and second guide pins 82 and 102 as a result of their tapered ends 84 and 104 engaging the angled sidewalls 68 and 70 of the shaft grooves 64. The result is a radial outward force of substantial magnitude being applied to each of the guide pins. In addition to being the means to adjust out backlash, the collar 136 provides the important function of limiting the radially outward movement of the first and second guide pins 82 and 102 in response to this force. The collar 136 has a circumferentially extending sidewall midportion 148 extending axially between the threaded end portion 138 and the end portion 142 of the collar, radially outward of, but adjacent to the outward end openings 80 and 100 of the sleeve portion and carrier radial bores 76 and 96. The sidewall portion 148 is provided to engage the outward ends of the first and second guide pins 82 and 102 and limit their radial outward movement away from the shaft grooves 64.

While the collar 136 keeps the first and second guide pins 82 and 102 from fully withdrawing from the shaft grooves 64, by selecting the appropriate size diameter for the collar and size length for the guide pins, the collar will allow a sufficient radial outward movement of the guide pins to avoid the tapered ends 84 and 104 of the guide pins contacting the bottom wall 72 of the shaft grooves 64 in which they project when the actuator 10 is operating under fluid power. This assures that the tapered ends 84 and 104 of the first and second guide pins 82 and 102 will always make contact with only the sidewalls 68 and 70 of the shaft grooves 64 and it is not necessary to be concerned with the exact length of the guide pins to avoid bottom contact. In the preferred embodiment the collar 136 is manufactured of hardened steel.

Although in the presently preferred embodiment of the invention the first end portions 114 of the rods 108 are used to prevent both rotational and axial movement of the carrier 88 relative to the piston sleeve 24 during fluid-powered operation of the actuator 10, while permitting substantially uninhibited axial adjusting movement of the carrier relative to the piston sleeve within at least a limited axial range during rotational adjusting movement of the collar 136 to eliminate backlash, other means of locking the carrier to the piston sleeve which permit axial movement of the carrier for adjustment purposes may be utilized.

It is noted that the actuator 10 of the present invention has been described with the shaft 36 rotatably driving the external device, the actuator may also be used with the shaft being held stationary and the rotational drive being provided by rotation of the body 12.

It will be appreciated that, although a specific embodiment of the invention has been described herein for purposes of illustration, various modifications may be made without departing from the spirit and scope of the invention. Accordingly, the invention is not limited except by the appended claims.

I claim:

1. A fluid-powered actuator comprising:

a body having first and second axially spaced-apart ends;

an axially elongated, rotatable shaft positioned within said body and supported for rotation relative to said body, said shaft having a plurality of exterior helical grooves extending over an axial portion of the length of said shaft, each said shaft groove having a pair of elongated, opposing first and second groove sidewalls spaced apart from each other, said first groove sidewall being positioned to one axial side of said groove toward said body first end and said second groove sidewall being positioned to an opposite axial side of said groove toward said body second end;

a piston sleeve reciprocally mounted within said body and having a head portion for application of fluid pressure to one or the other opposing axial sides thereof to produce axial movement of said piston sleeve within said body under fluid-powered operation of the actuator, said piston sleeve further having a sleeve portion positioned toward said body first end, with a central, axially extending opening coaxially receiving said shaft therein said sleeve portion having a plurality of radially extending bores extending fully therethrough and positioned with an inward end bore opening adjacent to said grooved axial portion of said shaft and an outward end bore opening, said sleeve portion having a first end portion positioned toward said body first end;

a plurality of first guide pins, each of said first guide pins being disposed in one of said piston sleeve radial bores, with an inward end pin portion projecting out of said sleeve portion inward end bore opening and into one of said shaft grooves and with an outward end pin portion positioned at said sleeve portion outward end bore opening, said first guide pins transmitting torque between said piston sleeve and said shaft in response to axial movement of said piston sleeve;

an annular pin carrier reciprocally mounted within said body coaxial with said piston sleeve, said carrier having a central, axially extending opening coaxially receiving said shaft therein said carrier having a plurality of radially extending bores extending fully therethrough and positioned with an inward end bore opening adjacent to said grooved axial portion of said shaft and an outward end bore opening, said carrier being adjustably axially movable within at least a limited axial range relative to said piston sleeve without producing relative rotation between said carrier and said piston sleeve, said carrier having a first end portion positioned toward said body first end and a second end portion positioned toward said sleeve portion first end portion;

a plurality of second guide pins, each of said second guide pins being disposed in one of said carrier radial bores, with an inward end pin portion projecting out of said carrier inward end bore opening and into one of said shaft grooves and with an outward end pin portion positioned at said carrier outward end bore opening, said second guide pins transmitting torque between said carrier and said shaft in response to axial movement of said piston sleeve;

a collar mounted within said body coaxial with said piston sleeve, said collar being adjustably rotatable within at least a limited rotational range relative to said piston sleeve and said carrier, said collar having a first end portion threadably engaging said carrier toward said carrier first end portion to produce axial adjusting movement of said carrier relative to said piston on rotational adjusting movement of said collar and a second end portion engaging said piston sleeve first end portion to permit substantially uninhibited rotational adjusting movement of said collar relative to said piston sleeve while inhibiting axial movement of said collar relative to said piston sleeve, said collar being adjustably rotatable in one rotational direction to produce axial adjusting movement of said carrier in one axial direction and adjustably rotatable in an opposite rotational direction to produce axial adjusting movement of said carrier in an opposite axial direction to produce adjustable and oppositely directed axial forces on said sleeve portion and said carrier sufficient to place said first guide pin inward end pin portions in firmly seated engagement with one of either said first or second groove sidewalls and said second guide pin inward end pin portions in firmly seated engagement with the other one of said first or second groove sidewalls to substantially eliminate backlash between said first guide pins and said shaft grooves engaged thereby and between said second guide pins and said shaft grooves engaged thereby as said piston sleeve moves from one axial direction to the other to produce relative rotational movement between said body and said shaft in response to selective application of fluid pressure to said piston sleeve head portion, said collar having a circumferentially extending sidewall portion positioned between said collar first and second end portions and radially outward of said carrier to engage said outward end pin portions of said first and second guide pins and limit radial movement of said first and second guide pins in a radially outward direction away from said shaft grooves as a result of forces applied thereto by rotational adjusting movement of said collar to eliminate backlash and by fluid-powered operation of the actuator;

a plurality of axially extending, elongated guide members positioned within said body transmitting torque between said piston sleeve and said body in response to axial movement of said piston sleeve, said guide members being attached to said piston sleeve for travel therewith during fluid-powered operation of the actuator, said body having a plurality of guide member receiving portions fixedly attached to said body and slidably engaging a smooth wall portion of at least one of said guide members and preventing rotational movement of said piston sleeve relative to said body while permitting substantially uninhibited reciprocating axial movement of said piston sleeve within said body during fluid powered operation, an end portion of said guide members extending between said piston sleeve and said carrier, said carrier having a plurality of axially extending apertures positioned to slidably receive said guide member end portions therein and prevent relative rotational movement between said carrier and said piston sleeve while permitting substantially uninhibited axial adjusting movement therebetween in response to rotational adjusting movement of said collar relative to said piston sleeve; and a plurality of threaded lock nuts, each selectively positionable on a correspondingly threaded end of one of said guide member end portions said lock nuts being selectively positionable to engage said carrier and apply a locking axial force between said carrier and said piston sleeve through said collar to lock said carrier to said piston sleeve and prevent axial movement of said carrier to said piston sleeve and prevent axial movement of said carrier relative to said piston sleeve during fluid-powered operation of the actuator, said lock nuts being selectively positionable to permit axial adjusting movement of said carrier relative to said piston sleeve on said guide member end portions within said limited axial range in response to rotational adjusting movement of said collar relative to said piston sleeve.

2. The actuator of claim 1 wherein said inward end pin portions of said first and second guide pins are tapered.

3. The actuator of claim 2 wherein said first and second groove sidewalls are correspondingly tapered to coact with said tapered inward end pin portions of said first and second guide pins.

4. The actuator of claim 1 wherein said first and second guide pins are rotatably disposed in said piston sleeve and carrier bores, respectively, and have a plurality of needle bearings circumferentially distributed thereabout between said pin and an interior sidewall of said bore within which each is disposed.

5. The actuator of claim 1 wherein said shaft grooves each have a bottom wall positioned between said first and second groove sidewalls; said first and second sidewalls and said outward end pin portions of said first and second guide pins are shaped so that upon engaging and coacting during fluid-powered operation of the actuator, said first and second guide pins are urged radially outward; and said collar sidewall portion is positionable to permit radially outward movement of said first and second guide pins by an amount sufficient to prevent said first and second guide pins from contacting said groove bottom walls during fluid-powered operation of the actuator.

6. A fluid-powered actuator comprising:

a body having first and second axially spaced-apart ends;

an axially elongated, rotatable shaft positioned within said body and supported for rotation relative to said body, said shaft having a plurality of exterior helical grooves extending over an axial portion of the length of said shaft, each said shaft groove having a pair of elongated, opposing first and second groove sidewalls spaced apart from each other, said first groove sidewall being positioned to one axial side of said groove toward said body first end and said second groove sidewall being positioned to an opposite axial side of said groove toward said body second end;

a piston sleeve reciprocally mounted within said body and having a head portion for application of fluid pressure to one or the other opposing axial sides thereof to produce axial movement of said piston sleeve within said body under fluid-powered operation of the actuator, said piston sleeve further having a sleeve portion positioned toward said body first end, with a central, axially extending opening coaxially receiving said shaft therein, said sleeve portion having a plurality of radially extending bores extending fully therethrough and positioned with an inward end bore opening adjacent to said grooved axial portion of said shaft and an outward end bore opening, said sleeve portion having a first end portion positioned toward said body first end;

a plurality of first guide pins, each of said first guide pins being disposed in one of said piston sleeve radial bores, with an inward end pin portion projecting out of said sleeve portion inward end bore opening and into one of said shaft grooves and with an outward end pin portion positioned at said sleeve portion outward end bore opening, said first guide pins transmitting torque between said piston sleeve and said shaft in response to axial movement of said piston sleeve;

an annular pin carrier reciprocally mounted within said body coaxial with said piston sleeve, said carrier having a central, axially extending opening coaxially receiving said shaft therein, said carrier having a plurality of radially extending bores extending fully therethrough and positioned with an inward end bore opening adjacent to said grooved axial portion of said shaft and an outward end bore opening, said carrier being adjustably axially movable within at least a limited axial range relative to said piston sleeve without producing relative rotation between said carrier and said piston sleeve, said carrier having a first end portion positioned toward said body first end and a second end portion positioned toward said sleeve portion first end portion;

a plurality of second guide pins, each of said second guide pins being disposed in one of said carrier radial bores, with an inward end pin portion projecting out of said carrier inward end bore opening and into one of said shaft grooves and with an outward end pin portion positioned at said carrier outward end bore opening, said second guide pins transmitting torque between said carrier and said shaft in response to axial movement of said piston sleeve;

a collar mounted within said body coaxial with said piston sleeve, said collar being adjustably rotatable within at least a limited rotational range relative to said piston sleeve and said carrier, said collar having a first end portion threadably engaging one or the other of said carrier first end portion or said piston sleeve first end portion to produce axial adjusting movement of said carrier relative to said piston sleeve on rotational adjusting movement of said collar and a second end portion engaging the other of said carrier first end portion or said piston sleeve first end portion to permit substantially uninhibited rotational adjusting movement of said collar relative thereto, said collar being adjustably rotatable in one rotational direction to produce axial adjusting movement of said carrier relative to said piston sleeve in one axial direction and adjustably rotatable in an opposite rotational direction to produce axial adjusting movement of said carrier relative to said piston sleeve in an opposite axial direction to produce adjustable and oppositely directed axial forces on said sleeve portion and said carrier sufficient to place said first guide pin inward end portions in firmly seated engagement with one of either said first or second groove sidewalls and said second guide pin inward end pin portions in firmly seated engagement with the other one of said first or second groove sidewalls to substantially eliminate backlash between said first guide pins and said shaft grooves engaged thereby and between said second guide pins and said shaft grooves engaged thereby as said piston sleeve moves from one axial direction to the other to produce relative rotational movement between said body and said shaft in response to selective application of fluid pressure to said piston sleeve head portion, said collar having a circumferentially extending sidewall portion positioned between said collar first and second end portion and radially outward of said carrier to engage said outward end pin portions of said first and second guide pins in a radially outward direction away from said shaft grooves as a result of forces applied thereto by rotational adjusting movement of said collar to eliminate backlash and by fluid-powered operation of the actuator;

a plurality of axially extending, elongated guide members positioned within said body transmitting torque between said piston sleeve and said body in response to axial movement of said piston sleeve, said guide members being attached to said piston sleeve for travel therewith during fluid-powered operation of the actuator, said body having a plurality of guide member receiving portions fixedly attached to said body and slidably engaging a smooth wall portion of at least one of said guide members and preventing rotational movement of said piston sleeve relative to said body while permitting substantially uninhibited reciprocating axial movement of said piston sleeve within said body during fluid-powered operation, an end portion of at least one of said guide members extending between said piston sleeve and said carrier, said carrier having an axially extending aperture positioned to slidably receive said guide member end portion therein and prevent relative rotational movement between said carrier and said piston sleeve while permitting substantially uninhibited axial adjusting movement therebetween in response to rotational adjusting movement of said collar relative to said piston sleeve; and means attached to said guide member end portion and engaging said carrier for preventing axial movement of said carrier on said guide member end portion relative to said piston sleeve during fluid-powered operation of the actuator while permitting substantially uninhibited axial adjusting movement of said carrier on said guide member end portion relative to said piston sleeve within said limited axial range during rotational adjusting movement of said collar.

7. The actuator of claim 6 wherein said inward end pin portions of said first and second guide pins are tapered.

8. The actuator of claim 7 wherein said first and second groove sidewalls are correspondingly tapered to coact with said tapered inward end pin portions of said first and second guide pins.

9. The actuator of claim 6 wherein said first and second guide pins are rotatably disposed in said piston sleeve and carrier bores, respectively, and have a plurality of needle bearings circumferentially distributed thereabout between said pin and an interior sidewall of said bore within which is disposed.

10. The actuator of claim 6 wherein said means for preventing axial movement of said carrier relative to said piston sleeve includes a threaded member selectively positionable with respect to a correspondingly threaded end of said guide member end portion, said threaded member being selectively positionable to engage said carrier and apply a locking axial force between said carrier and said piston sleeve through collar to lock said carrier to said piston sleeve during fluid-powered operation of the actuator, and being selectively positionable to permit axial adjusting movement of said carrier relative to said piston sleeve on said guide member end portion within said limited axial range in response to rotational adjusting movement of said collar relative to said piston sleeve.

11. The actuator of claim 6 wherein said shaft grooves each have a bottom wall positioned between said first and second groove sidewalls; said first and second sidewalls and said outward end pin portions of said first and second guide pins are shaped so that upon engaging and coacting during fluid-powered operation of the actuator, said first and second guide pins are urged radially outward; and said collar sidewall portion is positionable to permit radially outward movement of said first and second guide pins by an amount sufficient to prevent said first and second guide pins from contacting said groove bottom walls during fluid-powered operation of the actuator.

12. A fluid-powered actuator comprising:

a body having first and second axially space-apart ends;

an axially elongated, rotatable member positioned within said body and supported for rotation relative to said body, said member having a plurality of exterior helical grooves extending over an axial portion of the length of said member, each said member groove having a pair of elongated, opposing first and second groove sidewalls spaced apart from each other, said first groove sidewall being positioned to one axial side of said groove toward said body first end and said second groove sidewall being positioned to an opposite axial side of said groove toward said body second end;

a sleeve reciprocally mounted within said body, with a central, axially extending opening coaxially receiving said member therein, said sleeve having a plurality of radially extending bores extending fully therethrough and positioned with an inward end bore opening adjacent to said grooved axial portion of said member and an outward end bore opening, said sleeve having a first end portion positioned toward said body first end;

at least one piston reciprocally mounted within said body for application of fluid pressure to one or the other opposing axial sides thereof to produce axial movement of said piston within said body under fluid-powered operation of the actuator, said piston operatively engaging said sleeve to axially move said sleeve in response to axial movement of said piston;

a plurality of first guide pins, each of said first guide pins being disposed in one of said sleeve radial bores, with an inward end pin portion projecting out of said sleeve inward end bore opening and into one of said member grooves and with an outward end pin portion positioned at said sleeve outward end bore opening, said first guide pins transmitting torque between said piston sleeve and said member in response to axial movement of said piston;

an annular pin carrier reciprocally mounted within said body coaxial with said sleeve, said carrier having a central, axially extending opening coaxially receiving said member therein, said carrier having a plurality of radially extending bores extending fully therethrough and positioned with an inward end bore opening adjacent to said grooved axial portion of said member and an outward end bore opening, said carrier being adjustably axially movable within at least a limited axial range relative to said sleeve without producing relative rotation between said carrier and said sleeve, said carrier having a first end portion positioned toward said body first end and a second end portion positioned toward said sleeve first end portion;

a plurality of second guide pins, each of said second guide pins being disposed in one of said carrier radial bores, with an inward end pin portion projecting out of said carrier inward end bore opening and into one of said member grooves and with an outward end portion positioned at said carrier outward end bore opening, said second guide pins transmitting torque between said carrier and said member in response to axial movement of said piston;

a collar mounted within said body coaxial with said sleeve, said collar being adjustably rotatable within at least a limited rotational range relative to said sleeve and said carrier, said collar having a first end portion engaging said carrier toward said carrier first end portion and a second end portion engaging said sleeve first end portion, said collar having a circumferentially extending sidewall portion positioned between said collar first and second end portions and radially outward of said carrier to engage said outward end pin portions of said first and second guide pins and limit radial movement of said first and second guide pins in a radially outward direction away from said member grooves as a result of forces applied thereto by rotational adjusting movement of said collar to eliminate backlash and by fluid-powered operation of the actuator;

adjustment means for producing axial adjusting movement of said carrier relative to said sleeve in response to rotational adjusting movement of said collar, adjusting rotation of said collar in one rotational direction producing axial adjusting movement of said carrier in one axial direction and adjusting rotation of said collar in an opposite rotational direction producing axial adjusting movement of said carrier in an opposite axial direction to produce adjustable and oppositely directed axial forces on said sleeve and said carrier sufficient to place said first guide pin inward end pin portions in firmly seated engagement with one of either said first or second groove sidewalls and said second guide pin inward end pin portions in firmly seated engagement with the other one of said first or second groove sidewalls to substantially eliminate backlash between said first guide pins and said member grooves engaged thereby and between said second guide pins and said member grooves engaged thereby as said sleeve moves from one axial direction to the other to produce relative rotational movement between said body and said member in response to selective application of fluid pressure to said piston;

a plurality of axially extending, elongated guide members positioned within said body transmitting torque between said sleeve and said body in response to axial movement of said piston, said guide members being attached to said sleeve for travel therewith during fluid-powered operation of the actuator, said body having a plurality of guide member receiving portions fixedly attached to said body and each slidably engaging a smooth wall portion of one of said guide members and preventing rotational movement of said sleeve relative to said body while permitting substantially uninhibited reciprocating axial movement of said sleeve within said body during fluid-powered operation, an end portion of each of said guide members extending between said sleeve and said carrier, said carrier having a plurality of axially extending apertures positioned to each receive one of said guide member end portions therein and prevent relative rotational movement between said carrier and said sleeve while permitting substantially uninhibited axial adjusting movement therebetween in response to rotational adjusting movement of said collar relative to said sleeve; and lock means attached to said guide member end portions and engaging said carrier for preventing axial movement of said carrier on said guide member end portions relative to said sleeve during fluid-powered operation of the actuator while permitting substantially uninhibited axial adjusting movement of said carrier on said guide member end portions relative to said sleeve within said limited axial range during rotational adjusting movement of said collar.

13. The actuator of claim 12 wherein said inward end pin portions of said first and second guide pins are tapered.

14. The actuator of claim 13 wherein said first and second groove sidewalls are correspondingly tapered to coact with said tapered inward end pin portions of said first and second guide pins.

15. The actuator of claim 12 wherein said first and second guide pins are rotatably disposed in said sleeve and carrier bores, respectively, and have a plurality of needle bearings circumferentially distributed thereabout between said pin and an interior sidewall of said bore within which each is disposed.

16. The actuator of claim 12 wherein said lock means for preventing axial movement of said carrier relative to said sleeve includes a plurality of threaded lock nuts, each selectively positionable on a correspondingly threaded end of one of said guide member end portions, said lock nuts being selectively positionable to engage said carrier and apply a locking axial force between said carrier and said sleeve through said collar to lock said carrier to said sleeve during fluid-powered operation of the actuator, and being selectively positionable to permit axial adjusting movement of said carrier relative to said sleeve on said guide member end portions within said limited axial range in response to rotational adjusting movement of said collar relative to said sleeve.

17. The actuator of claim 12 wherein said shaft grooves each have a bottom wall positioned between said first and second groove sidewalls; said first and second sidewalls and said outward end pin portions of said first and second guide pins are shaped so that upon engaging and coacting during fluid-powered operation of the actuator, said first and second guide pins are urged radially outward; and said collar sidewall portion is positionable to permit radially outward movement of said first and second guide pins by an amount sufficient to prevent said first and second guide pins from contacting said groove bottom walls during fluid-powered operation of the actuator.

* * * * *

UNITED STATES PATENT AND TRADEMARK OFFICE
CERTIFICATE OF CORRECTION

PATENT NO. : 4,960,007
DATED : October 2, 1990
INVENTOR(S) : Paul P. Weyer

It is certified that error appears in the above-identified patent and that said Letters Patent is hereby corrected as shown below:

In claim 12, column 17, line 50, after "end" please insert --pin--.

Signed and Sealed this

Twenty-fourth Day of December, 1991

Attest:

HARRY F. MANBECK, JR.

*Attesting Officer*  *Commissioner of Patents and Trademarks*